(12) United States Patent
Horiguchi et al.

(10) Patent No.: US 11,966,634 B2
(45) Date of Patent: Apr. 23, 2024

(54) INFORMATION PROCESSING SYSTEM AND MEMORY SYSTEM

(71) Applicant: KIOXIA CORPORATION, Tokyo (JP)

(72) Inventors: Tomoya Horiguchi, Tokyo (JP); Daisuke Taki, Kanagawa (JP); Yukimasa Miyamoto, Kanagawa (JP); Takeshi Kumagaya, Tokyo (JP)

(73) Assignee: Kioxia Corporation, Tokyo (JP)

( * ) Notice: Subject to any disclaimer, the term of this patent is extended or adjusted under 35 U.S.C. 154(b) by 98 days.

(21) Appl. No.: 17/870,600

(22) Filed: Jul. 21, 2022

(65) Prior Publication Data

US 2023/0176787 A1 Jun. 8, 2023

(30) Foreign Application Priority Data

Dec. 2, 2021 (JP) ................................. 2021-196219

(51) Int. Cl.
 *G06F 3/06* (2006.01)
(52) U.S. Cl.
 CPC ............ *G06F 3/0659* (2013.01); *G06F 3/067* (2013.01); *G06F 3/0604* (2013.01)
(58) Field of Classification Search
 CPC ....... G06F 3/0659; G06F 3/067; G06F 3/0604
 See application file for complete search history.

(56) References Cited

U.S. PATENT DOCUMENTS

| | | | |
|---|---|---|---|
| 9,424,892 B2 | 8/2016 | Haneda | |
| 10,394,727 B2 | 8/2019 | Okita | |
| 2012/0311238 A1* | 12/2012 | Im | G06F 3/0688 |
| | | | 711/E12.083 |
| 2017/0187640 A1 | 6/2017 | Vasudevan et al. | |
| 2019/0163623 A1* | 5/2019 | Bae | G06F 3/0659 |
| 2020/0293465 A1* | 9/2020 | Yang | H04L 49/35 |
| 2020/0322287 A1 | 10/2020 | Connor et al. | |

FOREIGN PATENT DOCUMENTS

| | | |
|---|---|---|
| JP | 2014-194610 A | 10/2014 |
| JP | 2017-117448 A | 6/2017 |
| JP | 2018-112883 A | 7/2018 |

OTHER PUBLICATIONS

NVM Express "NVM Express™ over Fabrics Revision 1.1a" NVM Express, Inc., Jul. 12, 2021, pp. 62 URL: https://nvmexpress.org/wp-content/uploads/NVMe-over-Fabrics-1.1a-2021.07.12-Ratified.pdf, 84 pages.

* cited by examiner

*Primary Examiner* — Nicholas J Simonetti
(74) *Attorney, Agent, or Firm* — Kim & Stewart LLP

(57) ABSTRACT

A memory system includes a memory device including memory chips and a controller. The controller includes first processors configured to perform first processing of network packets in at least one of a network layer and a transport layer of a network protocol, and second processors configured to perform second processing with respect to the memory chips. The controller is configured to extract tag information from a header of a network packet, select one of the first processors associated with a first memory chip that is identified based on the tag information, and control the selected one of the first processors to perform the first processing with respect to the network packet, which causes one of the second processors associated with the first memory chip to perform the second processing based on a payload of the network packet.

20 Claims, 6 Drawing Sheets

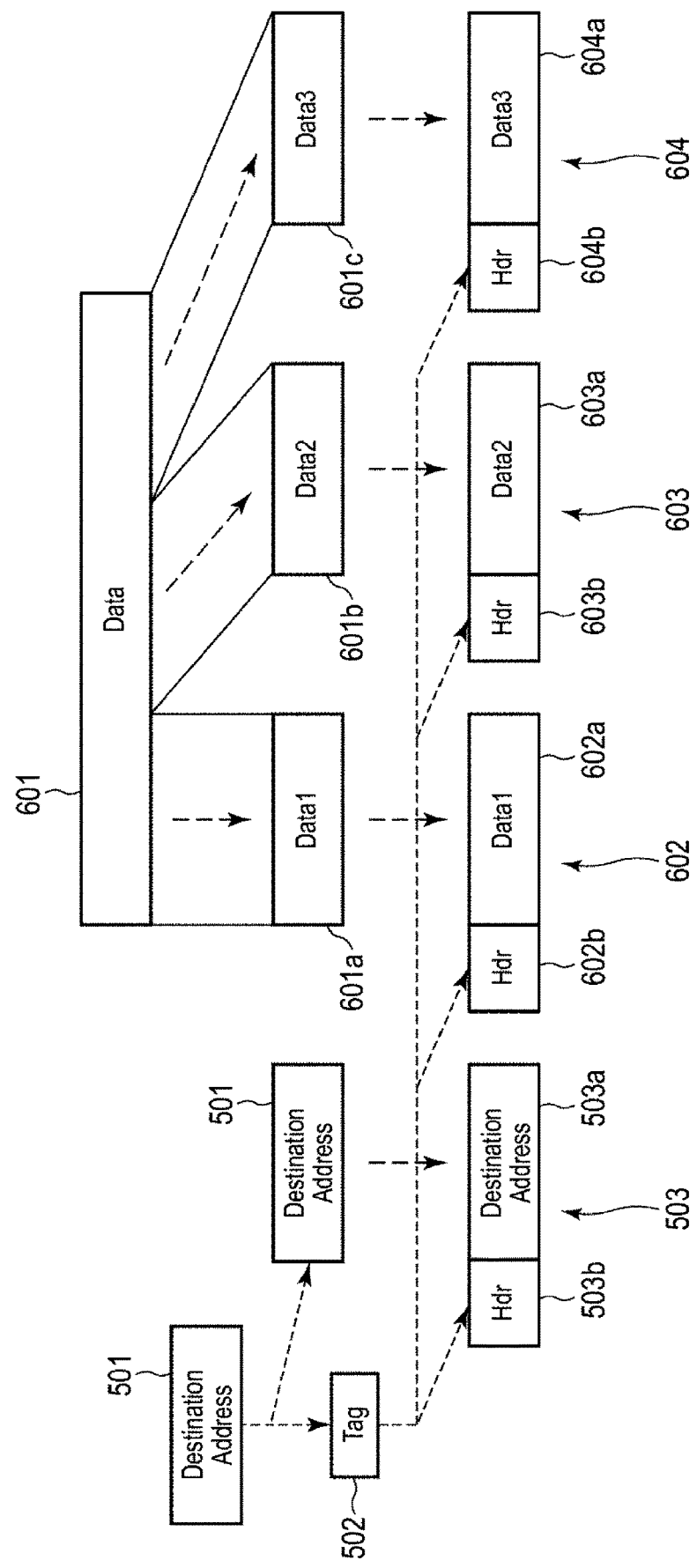

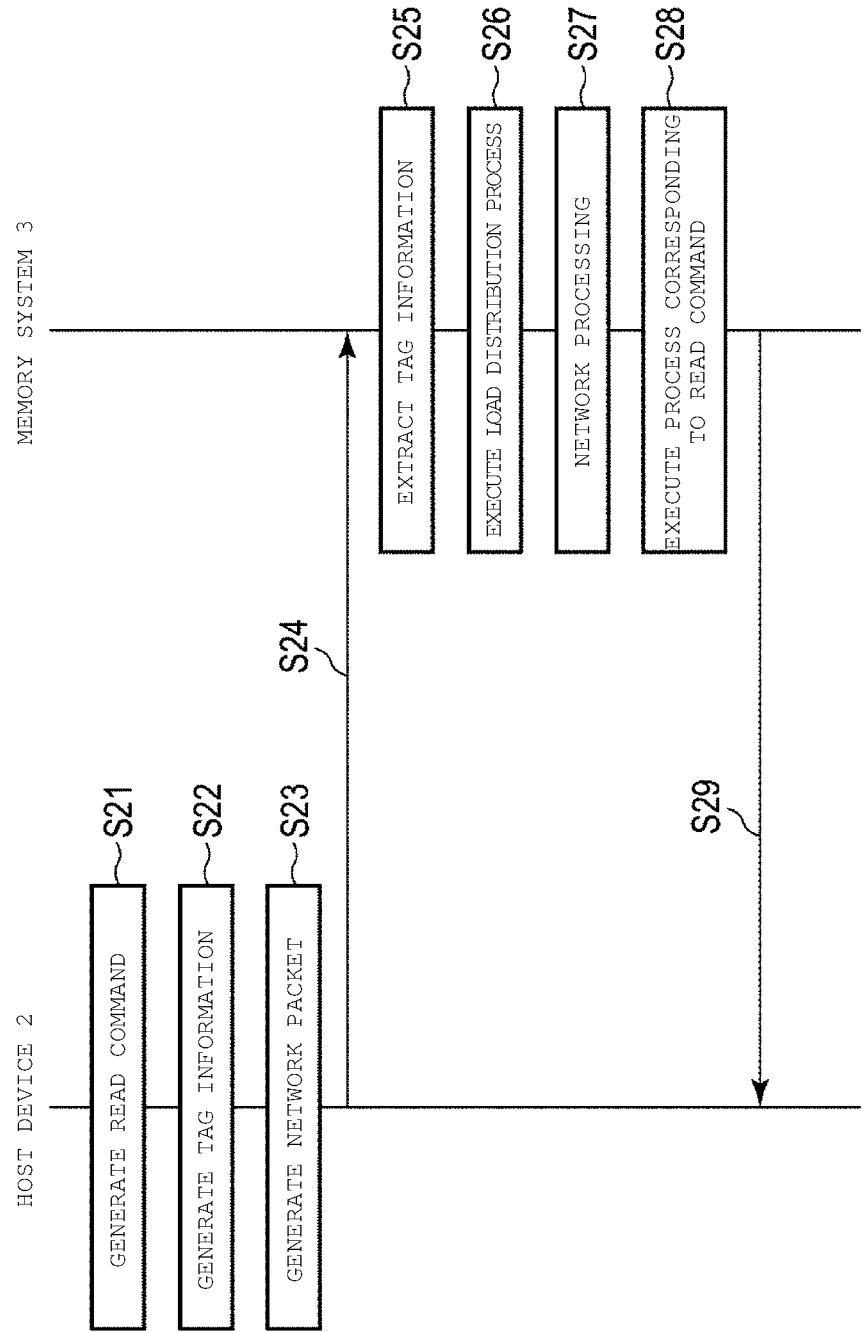

INFORMATION PROCESSING SYSTEM AND MEMORY SYSTEM

CROSS-REFERENCE TO RELATED APPLICATION(S)

This application is based upon and claims the benefit of priority from Japanese Patent Application No. 2021-196219, filed Dec. 2, 2021, the entire contents of which are incorporated herein by reference.

FIELD

Embodiments described herein relate generally to an information processing system and a memory system.

BACKGROUND

There is an information processing system (e.g., a network storage system) in which a host device can use a memory system (e.g., a storage device) having a nonvolatile memory via a network.

However, in the above memory system, a DRAM provided in the memory system is required to be used in order to execute a process corresponding to a command from the host device, and power consumption in the memory system increases in accordance with the access to the DRAM.

BRIEF DESCRIPTION OF THE DRAWINGS

FIG. 5 is a diagram showing an outline of a network packet transmitted from the host device to the memory system in the embodiment.

FIG. 6 is a sequence chart showing an example of a processing procedure of a read operation in the embodiment.

DETAILED DESCRIPTION

Embodiments provide an information processing system and a memory system capable of reducing power consumption.

In general, according to an embodiment, an information processing system includes a host device and a memory system connected to the host over a network. The memory system includes a memory device including a plurality of memory chips and a controller. The controller includes a plurality of first processors configured to perform first processing of network packets in at least one of a network layer and a transport layer of a network protocol, each of the first processors being associated with one of the memory chips, and a plurality of second processors configured to perform second processing with respect to the memory chips, each of the second processors being associated with one of the memory chips. The controller is configured to extract tag information from a header of a network packet received from the host device over the network, select one of the first processors associated with a first memory chip, which is one of the memory chips, that is identified based on the tag information, and control the selected one of the first processors to perform the first processing with respect to the network packet, which causes one of the second processors associated with the first memory chip to perform the second processing based on a payload of the network packet.

Hereinafter, embodiments will be described with reference to the drawings.

Figure 1:
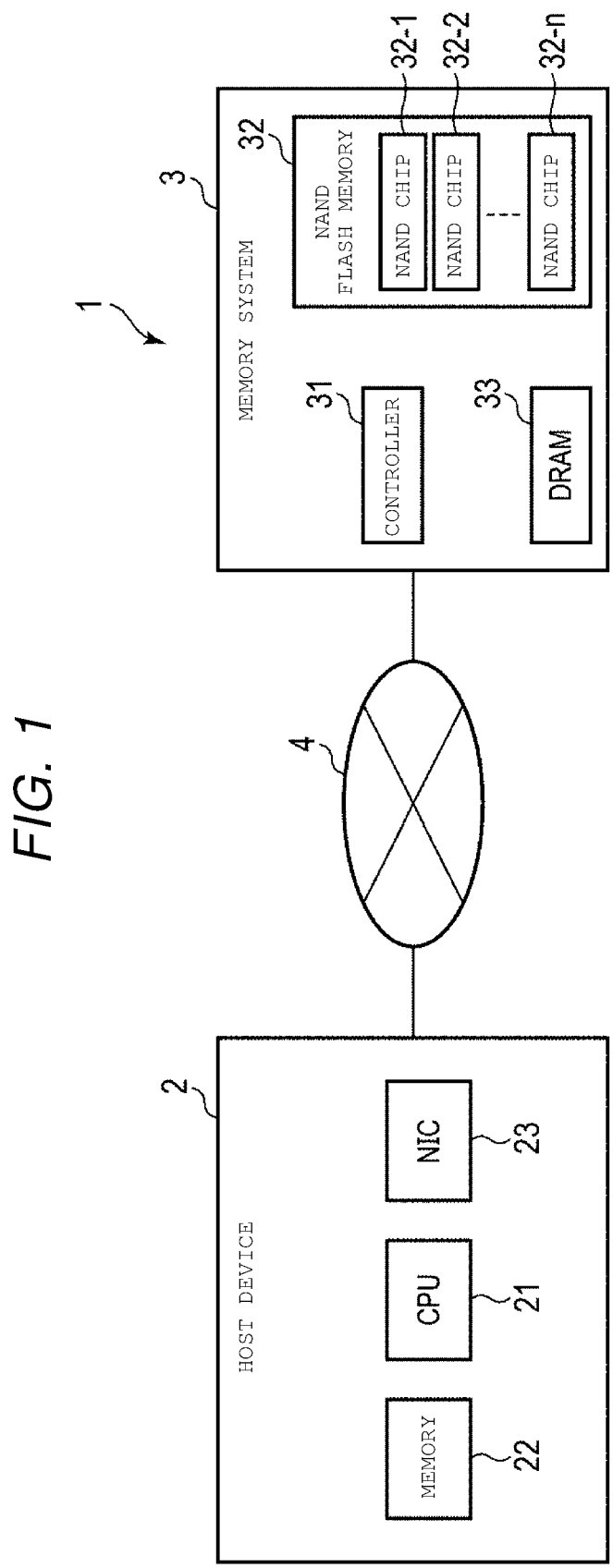
FIG. 1 is a block diagram showing an example of a configuration of an information processing system according to an embodiment.

FIG. 1 shows an example of a configuration of an information processing system according to an embodiment. As shown in FIG. 1, an information processing system 1 includes a host device 2 and a memory system 3.

In the present embodiment, the host device 2 and the memory system 3 are connected via a network 4. That is, the information processing system 1 corresponds to a network storage system in which the host device 2 can use the memory system 3 via the network 4.

The host device 2 includes a CPU 21, a memory 22, a network interface card (NIC) 23, and the like.

The CPU 21 controls an operation of the entire host device 2 and executes various processes for the host device 2 to operate as a host for the memory system 3.

The memory 22 is used to temporarily store (save) data to be written in the memory system 3 and data read from the memory system 3.

The NIC 23 operates as a network interface for the host device 2 to use the memory system 3 via the network 4.

The memory system 3 is a semiconductor storage device configured to write data to a nonvolatile memory thereof and read data from the nonvolatile memory. In the present embodiment, it is assumed that the memory system 3 is implemented by, for example, a solid state drive (SSD).

The memory system 3 includes a controller 31, a NAND flash memory 32, a DRAM 33, and the like.

The controller 31 has a function of controlling an operation of the memory system 3, and controls the NAND flash memory 32 and the DRAM 33 in order to execute various processes including processes corresponding to commands received from the host device 2. The commands received from the host device 2 include a write command for writing data to the memory system 3 (more specifically, NAND flash memory 32), a read command for reading data from the memory system 3 (more specifically, NAND flash memory 32), and the like.

The NAND flash memory 32 is a nonvolatile memory and includes a plurality of NAND chips 32-1 to 32-$n$ (where n is an integer of 2 or more). Since the NAND flash memory 32 includes the plurality of NAND chips 32-1 to 32-$n$ as described above, parallel processes can be performed on the NAND flash memory 32. The NAND flash memory 32 may be a NAND flash memory having a two-dimensional structure or a NAND flash memory having a three-dimensional structure.

Each of the plurality of NAND chips 32-1 to 32-$n$ provided in the NAND flash memory 32 has a memory cell array, which includes a plurality of memory cells (i.e., storage elements). This memory cell array includes a plurality of blocks. Each of the blocks provided in the memory cell array includes a plurality of pages. Each of the plurality of blocks functions as a unit of a data erase operation. Each of the plurality of pages is a unit of a data write operation and a unit of a data read operation, and includes a plurality of memory cells connected to the same word line.

Here, the memory system 3 is described as including a NAND flash memory as a nonvolatile memory, but the nonvolatile memory may be a phase change memory (PCM), a magnetoresistive random access memory (MRAM), or the like.

The DRAM 33 is a volatile memory, and functions as, for example, a temporary buffer used when the controller 31 executes various processes.

Here, the memory system 3 is described as having the DRAM 33 as a volatile memory, but the memory system 3 further includes a volatile memory such as static random access memory (SRAM) inside, for example, the controller 31.

FIG. 1 shows that, for convenience, one host device 2 and one memory system 3 are connected via the network 4, but the information processing system 1 according to the present embodiment may include a plurality of host devices 2 and a plurality of memory systems 3, which may be connected via one or a plurality of network switches (not shown). The network switch is a network device having a switching function and is used to achieve efficient data transfer.

In the present embodiment, for example, NVMe over Fabric (NVMe-oF) is used as an interface for connecting the host device 2 and the memory system 3 to each other. According to the NVMe-oF, it is possible to achieve high speed and high efficiency of connection between the host device 2 and the memory system 3. In the present embodiment, the NVMe-oF operates based on the standard of NVMe TCP Transport Binding, to operate on a TCP-based network, for example. Communication based on the TCP/IP regulation is executed between the host device 2 and the memory system 3.

Here, in the above-described information processing system 1, when the host device 2 uses the memory system 3 (i.e., the host device 2 writes data to the memory system 3 or the host device 2 reads data from the memory system 3), a network packet including a command generated (issued) by the host device 2 is transmitted from the host device 2 to the memory system 3 via the network 4.

When the network packet transmitted from the host device 2 is received by the memory system 3, the memory system 3 is required to execute a process related to the reception of the network packet (hereinafter, referred to as network processing). This network processing includes, for example, processing based on TCP/IP regulations for network packets (i.e., processing in the network layer and the transport layer).

Since an amount of processing of this network processing is smaller than that of other processing executed in the memory system 3, for example, in an environment where a communication speed is about 10 or 100 Mbps and a frequency of receiving a network packet is relatively low, even if a single CPU or a specific CPU among a plurality of CPUs (hereinafter, simply referred to as a single CPU) is in charge of the overall network processing, the network processing does not become a bottleneck.

However, when a single CPU is in charge of the overall network processing in an environment where a communication speed exceeds 1 Gbps, the network processing becomes a bottleneck, and thus a process corresponding to a command generated by the host device 2 cannot be efficiently executed.

To address this issue, for example, by applying a technique called receive side scaling (RSS), it is possible to distribute the network processing (e.g., a load due to the network processing) to a plurality of CPUs.

Hereinafter, an outline of a memory system according to a comparative example of the present embodiment will be described with reference to FIG. 2. It is assumed that a memory system 3' according to the comparative example of the present embodiment is connected to a host device 2' via a network and has a configuration in which the above-described network processing is distributed to a plurality of CPUs.

Figure 2:
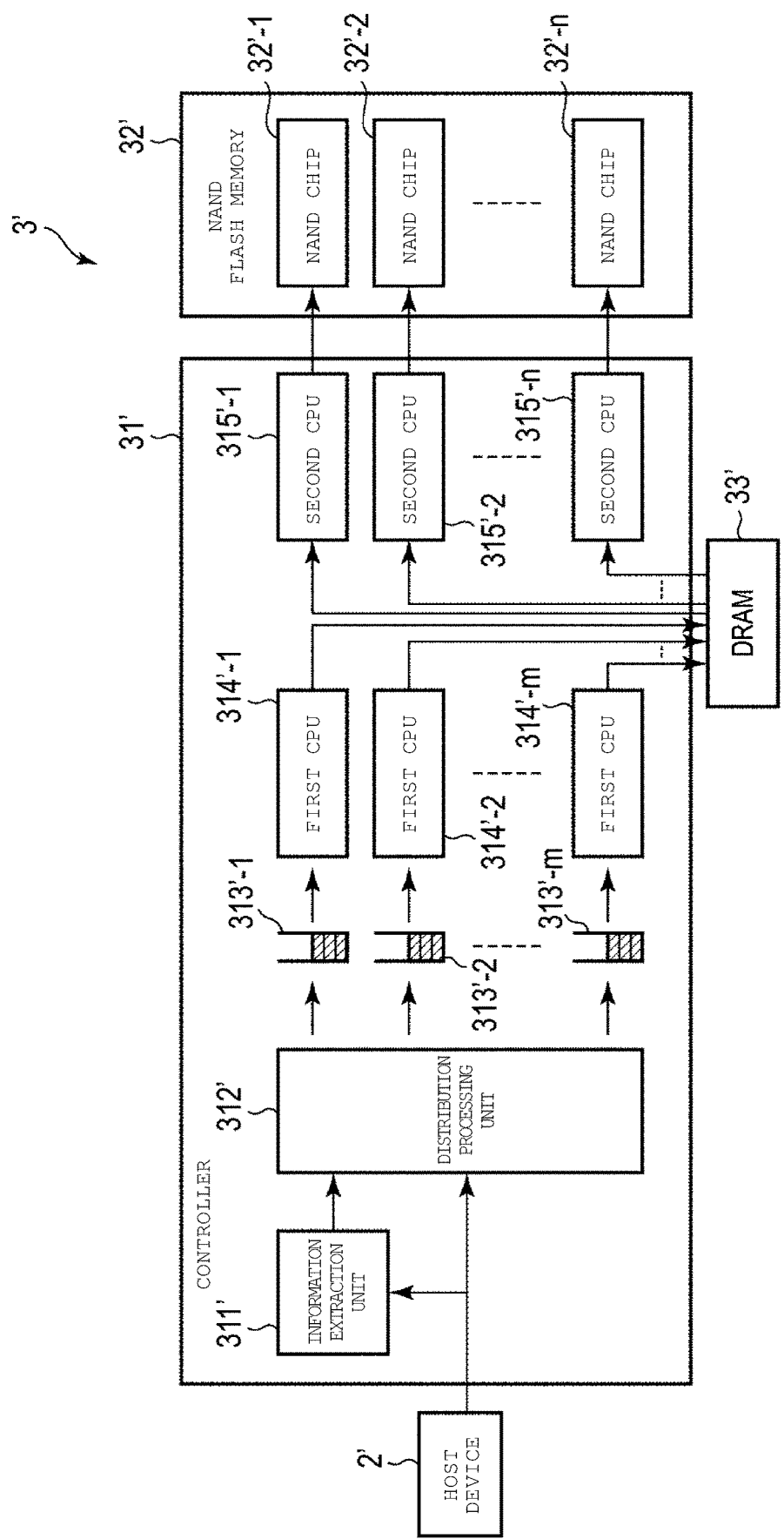
FIG. 2 is a block diagram showing an outline of a memory system according to a comparative example of the embodiment.

With reference to FIG. 2, a configuration and an operation of the memory system 3' related to the reception of network packets will be described, and the description of other configurations and operations will be omitted.

First, when the host device 2' uses the memory system 3', the host device 2' generates a command (e.g., an NVMe-oF command), and transmits a network packet including a payload for storing the command, a header for storing an IP address, a TCP port number, and the like (i.e., a network packet in which the header is added to the payload) to the memory system 3'.

The IP address included in the header of the network packet includes a transmission source IP address assigned to the host device 2', which is a transmission source of the network packet, and a transmission destination IP address assigned to the memory system 3', which is a transmission destination of the network packet. The TCP port number included in the header is an identification number used in TCP (e.g., a number for specifying an application program operating at a communication destination).

As described above, the network packet transmitted from the host device 2' is received by the memory system 3'.

As shown in FIG. 2, the memory system 3' includes a controller 31', a NAND flash memory 32', and a DRAM 33'. The controller 31' includes an information extraction unit 311', a distribution processing unit 312', a plurality of network queues 313'-1 to 313'-m, a plurality of first CPUs 314'-1 to 314'-m, and a plurality of second CPUs 315'-1 to 315'-n. The NAND flash memory 32' includes a plurality of NAND chips 32'-1 to 32'-n.

The information extraction unit 311' extracts information such as the IP address and the TCP port number from the header of the network packet received from the host device 2', and passes the extracted information to the distribution processing unit 312'. The information passed from the information extraction unit 311' to the distribution processing unit 312' may be the IP address and the TCP port number itself, or may be a value (e.g., a hash value) uniquely determined from at least a part of the IP address and the TCP port number.

The distribution processing unit 312' executes a load distribution process of selecting (determining) one first CPU that will execute (i.e., in charge of) the network processing from among the plurality of first CPUs 314'-1 to 314'-m (where m is an integer of 2 or greater) on the basis of the information passed from the information extraction unit 311'. According to such a load distribution process, for example, a specific first CPU is uniquely selected on the basis of the information passed from the information extraction unit 311', for example, the IP address and the TCP port number. Since the specific first CPU is in charge of the network processing, access from the same application program from the same host device is more likely to be processed continuously by the same first CPU. Also, because of the locality of the program and data at the time of execution of the same application, a hit ratio of a cache in the first CPU can be improved and a processing capacity of the first CPU can be improved.

Here, it is described that the distribution processing unit 312' selects the first CPU to execute the network processing on the basis of the information passed from the information extraction unit 311', but the distribution processing unit 312' may cause, for example, each of the plurality of first CPUs 314'-1 to 314'-m to execute the network processing in round robin order. In the case of such a configuration, the information extraction unit 311' may be omitted.

The plurality of network queues 313'-1 to 313'-m are queues for delivering (transferring) network packets from the distribution processing unit 312' to the plurality of first CPUs 314'-1 to 314'-m. The plurality of network queues 313'-1 to 313'-m correspond to the plurality of first CPUs 314'-1 to 314'-m, respectively.

According to the above configuration of the comparative example, when the first CPU 314'-1 is selected by the distribution processing unit 312', the network packet is stored in the network queue 313'-1 corresponding to the first CPU 314'-1. According to this, the first CPU 314'-1 can retrieve a network packet from the network queue 313'-1.

Here, the case where the first CPU 314'-1 retrieves the network packet is described, but, for another first CPU, a network packet can also be retrieved from a network queue corresponding to the first CPU.

That is, the distribution processing unit 312 can deliver the network packet to the first CPU by storing the network packet in the network queue corresponding to the first CPU selected in the load distribution process.

The plurality of first CPUs 314'-1 to 314'-m are CPUs (e.g., CPUs for network processing) that function as processing units configured to execute the above network processing on the network packet (e.g., a process related to reception of the network packet) received from the distribution processing unit 312.

When the network processing on the network packet is executed as described above, the plurality of first CPUs 314'-1 to 314'-m store commands included in the payload of the network packet into the DRAM 33' via a DRAM interface (I/F) (not shown).

The plurality of second CPUs 315'-1 to 315'-n are CPUs (e.g., CPUs for FTL/NAND processing) that function as processing units configured to execute, for example, flash translation layer (FTL) processing for data management and block management of the NAND flash memory 32' and respectively access the plurality of NAND chips 32'-1 to 32'-n provided in the NAND flash memory 32' (e.g., execute a NAND control process on the NAND flash memory 32'). The plurality of second CPUs 315'-1 to 315'-n access the NAND chips 32'-1 to 32'-n, respectively, via a NAND chip interface (not shown) such as a toggle. The plurality of second CPUs 315'-1 to 315'-n correspond to a plurality of NAND chips 32'-1 to 32'-n, respectively, included in the NAND flash memory 32'.

When commands are stored in the DRAM 33' by the plurality of first CPUs 314'-1 to 314'-m as described above, the plurality of second CPUs 315'-1 to 315'-n read the commands from the DRAM 33' via the above DRAM interface, for example, in response to notifications from the plurality of first CPUs 314'-1 to 314'-m. The plurality of second CPUs 315'-1 to 315'-n execute processes corresponding to the commands read from the DRAM 33' for the NAND chips corresponding to the plurality of second CPUs 315'-1 to 315'-n.

In the memory system 3' according to the comparative example of the present embodiment, the network processing on the network packet transmitted from the host device 2' may be distributed to the plurality of first CPUs 314'-1 to 314'-m as described above.

Here, the memory system 3' according to the comparative example of the present embodiment has a configuration in which the network processing is distributed by using the IP address, the TCP port number, and the like included in the header of the network packet, and there is no relationship between distribution of the network processing (i.e., the first CPU that executes the network processing) and the second CPU that accesses the NAND chip when executing a process corresponding to the command stored in the payload included in the network packet.

Therefore, in the memory system 3' according to the comparative example of the present embodiment, the second CPU (i.e., a CPU for FTL/NAND processing) to which a command is delivered from the first CPU (i.e., a CPU for network processing) cannot be specified at the time at which a load distribution process is executed. In this case, it is necessary to perform an operation in which, after the network processing is executed by each of the plurality of first CPUs 314'-1 to 314'-m, the command is temporarily saved in a memory space having a large data area such as the DRAM 33', and each of the plurality of second CPUs 315'-1 to 315'-n reads the command from the DRAM 33'.

Since the memory system 3' is required to perform a process by using limited resources (e.g., a DRAM area, a bandwidth, and power consumption) compared with a server device or the like, power consumption in the memory system 3' increases due to access to the DRAM 33' (i.e., complicated data delivery from the plurality of first CPUs 314'-1 to 314'-m to the plurality of second CPUs 315'-1 to 315'-n) according to the above operation.

To address the issue involved in the comparative example, the present embodiment is directed to reducing power consumption of the memory system 3 in the information processing system 1 in which the host device 2 uses the memory system 3 via the network 4.

Figure 3:
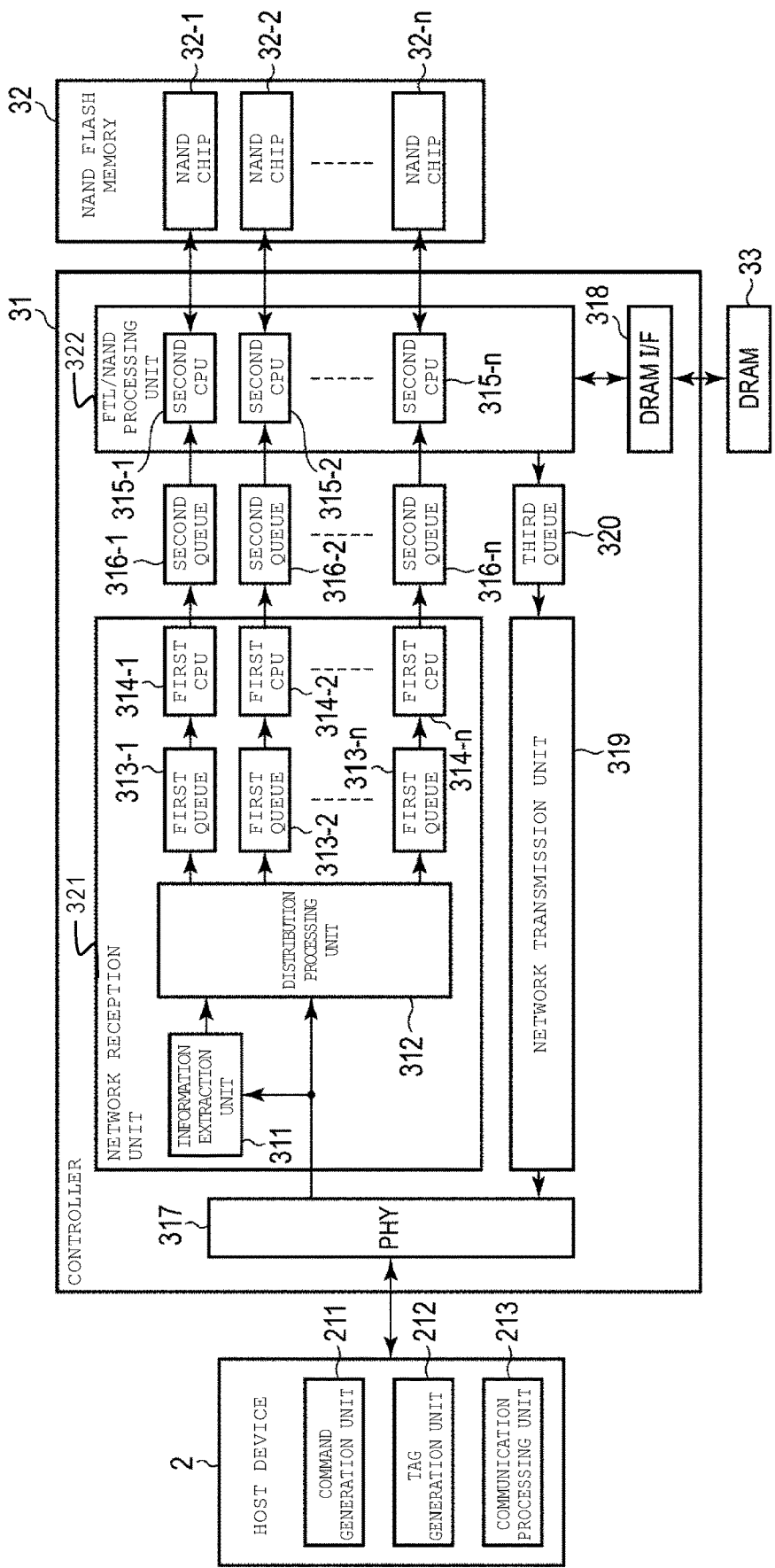
FIG. 3 shows an example of a configuration of a host device and a memory system provided in the information processing system according to the embodiment.

FIG. 3 shows an example of a configuration of the host device 2 and the memory system 3 provided in the information processing system 1 according to the present embodiment.

As shown in FIG. 3, the host device 2 includes a command generation unit 211, a tag generation unit 212, and a communication processing unit 213. In the present embodiment, some or all of the command generation unit 211, the tag generation unit 212, and the communication processing unit 213 are implemented by the CPU 21 provided in the host device 2 shown in FIG. 1 executing a predetermined program (i.e., software), but may be implemented by hardware such as an integrated circuit (IC), or may be implemented by a combination of software and hardware.

When the host device 2 uses the memory system 3, for example, an appropriate NAND chip can be accessed by converting a logical address designated by the host device 2 (i.e., a logical address used when the host device 2 accesses the memory system 3) into a physical address (i.e., a physical location of the NAND chip provided in the NAND flash memory 32 when accessing the NAND flash memory 32). In the present embodiment, it is assumed that the process of converting such a logical address into a physical address is not executed by the memory system 3, but the physical address converted from the logical address is designated by the host device 2. In this case, the host device 2 may store a table (not shown) used to convert a logical address into a physical address, and the host device 2 may execute a process of converting a logical address into a physical address by referring to the table.

The command generation unit 211 generates a command in which the above physical address (i.e., a physical location of the NAND chip) is designated.

The tag generation unit 212 generates tag information on the basis of the physical address designated in the command generated by the command generation unit 211.

The communication processing unit 213 generates a network packet including a payload for storing the command generated by the command generation unit 211 and a header for storing the tag generated by the tag generation unit 212, and transmits the network packet to the memory system 3. The header of the network packet further contains the IP address, the TCP port number, and the like described in the comparative example of the present embodiment described above.

As shown in FIG. 3, the memory system 3, more specifically, the controller 31 of the memory system 3 includes a network reception unit 321 configured to execute a process of receiving a network packet transmitted from the host device 2, and an FTL/NAND processing unit 322 configured to execute FTL processing and a NAND control process. Each component of the controller may be implemented with hardware (e.g., circuit) or a combination of hardware and software.

The network reception unit 321 includes an information extraction unit 311, a distribution processing unit 312, a plurality of first queues 313-1 to 313-n, and a plurality of first CPUs 314-1 to 314-n. The FTL/NAND processing unit 322 includes a plurality of second CPUs 315-1 to 315-n.

The information extraction unit 311, the distribution processing unit 312, the plurality of first queues 313-1 to 313-n, the plurality of first CPUs 314-1 to 314-n, and the plurality of second CPUs 315-1 to 315-n shown in FIG. 3 correspond to the information extraction unit 311', the distribution processing unit 312', the plurality of network queues 313'-1 to 313'-m, the plurality of first CPUs 314'-1 to 314'-m, and the plurality of second CPUs 315'-1 to 315'-n shown in FIG. 2, respectively. In the following description, the description will focus on differences from the above-described comparative example of the present embodiment.

In the present embodiment, the memory system 3 further includes a plurality of second queues 316-1 to 316-n between the network reception unit 321 and the FTL/NAND processing unit 322.

Although description is omitted in the above-described comparative example of the present embodiment, the memory system 3 further includes a physical layer processing unit (PHY) 317, a DRAM interface 318, a network transmission unit 319, and a third queue 320.

When a network packet is transmitted from the host device 2 (communication processing unit 213) as described above, the physical layer processing unit 317 executes physical layer processing on the network packet and delivers the network packet to the network reception unit 321. The physical layer processing unit 317 is assumed to be connected to the above network switch.

The information extraction unit 311 extracts the tag information included in the header of the network packet delivered from the physical layer processing unit 317, and passes the extracted information to the distribution processing unit 312.

The distribution processing unit 312 executes a load distribution process of selecting (determining) one first CPU that will execute network processing with respect to the network packet delivered from the physical layer processing unit 317 from among the plurality of first CPUs 314-1 to 314-n on the basis of the tag information extracted by the information extraction unit 311.

The plurality of first queues 313-1 to 313-n are queues used to transfer network packets from the distribution processing unit 312 to the plurality of first CPUs 314-1 to 314-n. The plurality of first queues 313-1 to 313-n respectively correspond to the plurality of first CPUs 314-1 to 314-n.

According to such a configuration, for example, when the first CPU 314-1 is selected by the distribution processing unit 312, the network packet is stored in the first queue 313-1 corresponding to the first CPU 314-1. In this case, the first CPU 314-1 can retrieve the network packet from the first queue 313-1.

Here, the case where the first CPU 314-1 retrieves the network packet is described, but, for another first CPU, a network packet can also be retrieved from a first queue corresponding to the first CPU.

The plurality of first CPUs 314-1 to 314-n (i.e., CPUs for network processing) execute the above network processing with respect to the network packets distributed by the distribution processing unit 312.

The plurality of second CPUs 315-1 to 315-n execute the above FTL processing and the above NAND control process for the NAND flash memory 32.

The plurality of second queues 316-1 to 316-n are queues used to transfer commands included in the payload of the network packet on which network processing has been executed from the first CPUs 314-1 to 314-n to the plurality of second CPUs 315-1 to 315-n. The plurality of second queues 316-1 to 316-n respectively correspond to the plurality of first CPUs 314-1 to 314-n, and also respectively correspond to the plurality of second CPUs 315-1 to 315-n. In other words, the plurality of second CPUs 315-1 to 315-n correspond to the plurality of first CPUs 314-1 to 314-n, respectively, and correspond to the plurality of second queues 316-1 to 316-n, respectively.

According to such a configuration, for example, when network processing is executed by the first CPU 314-1, a command included in the payload of the network packet on which the network processing has been executed is stored in the second queue 316-1 corresponding to the first CPU 314-1. In this case, the second CPU 315-1 can retrieve the command from the second queue 316-1 (in other words, the first CPU 314-1).

When a command is retrieved from the second queue 316-1 as described above, the second CPU 315-1 executes a process corresponding to the command for the NAND chip 32-1.

Here, for convenience, the first CPU 314-1, the second CPU 315-1, the second queue 316-1, and the NAND chip 32-1 are described, but the same applies to other first CPUs, second CPUs, second queues, and NAND chips.

The commands generated by the host device 2 (command generation unit 211) include, for example, a write command and a read command. For example, when a write command is generated by the host device 2, the plurality of second CPUs 315-1 to 315-n execute a process of writing data into a NAND chips corresponding to the second CPUs on the basis of the write command. For example, when a read command is generated by the host device 2, the plurality of second CPUs 315-1 to 315-n execute a process of reading data from NAND chips corresponding to the second CPUs on the basis of the read command.

The DRAM interface 318 is a DRAM control circuit configured to control the DRAM 33.

The network transmission unit 319 is configured to execute a process of transmitting a network packet to the host device 2 via the physical layer processing unit 317. Although not shown in FIG. 3, the network transmission unit 319 includes a CPU that executes a process or the like of generating a network packet. The CPU provided in the network transmission unit 319 may be at least one of the plurality of first CPUs 314-1 to 314-*n* provided in the network reception unit 321. In other words, there may be a configuration in which the network reception unit 321 and the network transmission unit share the same CPU (e.g., a CPU for network processing).

The third queue 320 is a queue for transferring, for example, data read from the NAND chips 32-1 to 32-*n* by the second CPUs 315-1 to 315-*n* provided in the FTL/NAND processing unit 322 to the network transmission unit 319.

In the present embodiment, it is assumed that the information extraction unit 311 and the distribution processing unit 312 are implemented by hardware such as a dedicated circuit, but one or both of the information extraction unit 311 and the distribution processing unit 312 may be implemented, for example, by the controller 31 executing a predetermined program (i.e., software), or by a combined configuration of hardware and software.

The plurality of first queues 313-1 to 313-*n*, the plurality of second queues 316-1 to 316-*n*, and the third queue 320 are implemented by SRAMs (i.e., volatile memory chips mounted on the controller 31) that can be accessed with low power consumption compared with the DRAM 33. In FIG. 3, it is assumed that the plurality of first queues 313-1 to 313-*n*, the plurality of second queues 316-316-*n*, and the third queue 320 are independent queues in a FIFO format. Alternatively, the plurality of first queues 313-1 to 313-*n*, the plurality of second queues 316-316-*n*, and the third queue 320 may be ring buffers or the like prepared for each CPU in a common memory space.

In FIG. 3, it is assumed that the number of the plurality of second CPUs 315-1 to 315-2 and the number of the plurality of second queues 316-1 to 316-*n* are the same (i.e., the second CPU and the second queue have a one-to-one correspondence), but the second CPU and the second queue may have a one-to-many relationship. That is, one second CPU may execute a process corresponding to commands stored in the plurality of second queues.

Similarly, in FIG. 3, it is assumed that the number of the plurality of second CPUs 315-1 to 315-*n* and the number of the plurality of NAND chips 32-1 to 32-*n* are the same (i.e., the second CPU and the NAND chip have a one-to-one correspondence), but the second CPU and the NAND chip may have a one-to-many relationship. That is, one second CPU may be configured to access a plurality of NAND chips.

As described above, it is assumed that the first queue and the first CPU have a one-to-one correspondence, and the first CPU and the second queue have a one-to-one correspondence.

That is, in the present embodiment, a plurality of first queues, a plurality of first CPUs, a plurality of second queues, a plurality of second CPUs, and a plurality of NAND chips may have a correspondence relationship in which a first CPU in charge of network processing can be specified on the basis of tag information (i.e., locations in the nonvolatile memory chips).

Hereinafter, an operation of the information processing system 1 (i.e., the host device 2 and the memory system 3) according to the present embodiment will be described. As described above, commands generated by the host device 2 include a write command and a read command. In the following description, a process when a write command is generated by the host device 2 (hereinafter referred to as a write operation) and a process when a read command is generated by the host device 2 (hereinafter referred to as a read operation) will be described.

First, an example of a processing procedure of the write operation in the present embodiment will be described with reference to a sequence chart of FIG. 4.

When the host device 2 writes data in the memory 22 (hereinafter referred to as write data) into the memory system 3 (i.e., the NAND flash memory 32), a write operation request is generated in the host device 2, and the command generation unit 211 included in the host device 2 generates a write command in response to the request (step S1).

In the write command generated in step S1, a write data and a physical address indicating a location of the NAND chip included in the NAND flash memory 32 into which the write data is to be written are designated. Specifically, the write command generated in step S1 includes a source address indicating a location of an area in the memory 22 in which the write data is to be stored. The write command generated in step S1 includes an ID assigned to the NAND chip into which the write data is to be written (hereinafter referred to as a chip ID) and a destination address (i.e., a physical address) indicating a location of the NAND chip (i.e., an address assigned to the location).

Next, the tag generation unit 212 generates tag information on the basis of the destination address (i.e., a location of the specific NAND chip) included in the write command generated in step S1 (step S2).

The tag information generated in step S2 may be generated on the basis of the above destination address, and may be, for example, a chip ID included in the destination address, or may be the destination address itself (i.e., a physical address). The tag information may be, for example, one or more upper bits (e.g., high-order bit(s) or highest-order bit) of the destination address (i.e., a physical address).

The tag information may be a value (e.g., a hash value) uniquely determined from at least a part of the above destination address.

According to the NVMe standard, there is a technique called a zoned namespace (ZNS) in which the entire memory space of the memory system 3 (e.g., an SSD) is divided into zones of a certain capacity, data having the same purpose or cycle of use is managed in the same zone, and thus the memory system 3 is efficiently used. The tag information may be a number used in such a ZNS (e.g., a ZNS number). The ZNS number can be specified from the above destination address. The tag information may be a value uniquely determined from this ZNS number.

That is, the tag information in the present embodiment may be any information that can specify a NAND chip of which a physical location is designated in a write command (i.e., the NAND chip accessed on the basis of the command).

Next, the communication processing unit 213 generates a network packet (hereinafter referred to as a first target packet) on the basis of the write command generated in step S1 and the tag information generated in step S2 (step S3). The first target packet includes the payload and the header, and in step S3, the first target packet in which the write command is stored in the payload and the tag information is stored in the header is generated.

A header field (i.e., a packet header field) in which the above tag information is stored may be, for example, an option field defined in IPv4 (e.g., an option field of an IPv4 packet header), or may be an extension header (e.g., an extension header of an IPv6 packet header) defined in IPv6.

The header field in which the tag information is stored may be an option field defined in TCP (e.g., an option field of a TCP packet header).

As described above, the IP address, the TCP port number, and the like are further stored in the header included in the first target packet, but there may be a configuration in which the IP address or the TCP port number is determined from the tag information (e.g., the IP address or TCP port number to be used is determined by using a function or a table that can uniquely determine the IP address or TCP port number from the tag information). In this case, the tag information may be stored in a part of a field of the IP address or the TCP port number. In this case, depending on the type (number) of tags that can be generated, it is necessary to secure IP communication or TCP connection in advance and to store information for determining tag information from the IP address or the TCP port number in the memory system 3. For example, when the tag information is a chip ID, TCP port numbers (i.e., TCP connections) corresponding to the number of the plurality of NAND chips 32-1 to 32-*n* provided in the NAND flash memory 32 in advance when a network between the host device 2 and the memory system 3 is established (i.e., when a connection is established) are allocated, and a correspondence relationship between the tag information (chip ID) and the TCP port numbers is shared between the host device 2 and the memory system 3. If such a correspondence relationship is shared, the memory system 3 can determine (acquire) the TCP port numbers from the tag information on the basis of the correspondence relationship.

If the host device 2 and the memory system 3 know each other, a new packet header may be added to the beginning of the payload included in the first target packet (i.e., a TCP packet), and the tag information may be stored in the header.

Here, the header field including the tag information is described, but the tag information may be included in a header (e.g., a header according to a network protocol) of the first target packet.

When the process in step S3 is executed, the communication processing unit 213 transmits the first target packet to the memory system 3 (step S4).

The first target packet transmitted from the host device 2 (communication processing unit 213) in step S4 is received by the memory system 3. The first target packet received by the memory system 3 as described above is passed to the network reception unit 321 via the physical layer processing unit 317 provided in the controller 31.

The information extraction unit 311 provided in the network reception unit 321 extracts the tag information included in the header of the first target packet (step S5).

Next, the distribution processing unit 312 executes a load distribution process on the basis of the tag information extracted in step S5 (step S6).

In this load distribution process, the distribution processing unit 312 can specify one NAND chip among the plurality of NAND chips 32-1 to 32-*n* provided in the NAND flash memory 32 on the basis of the tag information (e.g., a chip ID) extracted in step S5.

Since the plurality of NAND chips 32-1 to 32-*n* correspond to the plurality of second CPUs 315-1 to 315-*n*, respectively, the distribution processing unit 312 can specify a second CPU corresponding to the NAND chip specified as described above among the plurality of second CPUs 315-1 to 315-*n*.

Since the plurality of second CPUs 315-1 to 315-*n* correspond to a plurality of second queues 316-1 to 316-*n*, respectively, and the plurality of second queues 316-1 to 316-*n* correspond to the plurality of first CPUs 314-1 to 314-*n*, respectively, the distribution processing unit 312 can specify a second queue corresponding to the second CPU specified as described above, and can further specify a first CPU corresponding to the second queue.

In the load distribution process in step S6, the first CPU specified from the tag information as described above is selected as the first CPU that executes network processing.

When the tag information is a chip ID, the first CPU that executes network processing can be selected on the basis of a NAND chip specified from the chip ID. Alternatively, when the tag information is not a chip ID (i.e., tag information other than the chip ID is generated), for example, when a network between the host device 2 and the memory system 3 is established, a conversion table (i.e., a conversion table used to convert tag information into a chip ID) in which a correspondence relationship between the tag information and the chip ID is defined is created in advance. According to such a conversion table, the distribution processing unit 312 can convert tag information into a chip ID, and can thus select a first CPU by using the chip ID. The conversion table may be generated on the host device 2 side or may be generated on the memory system 3 side.

Here, the conversion table in which a correspondence relationship between tag information and a chip ID is defined has been described as being created in advance, but any applicable information (i.e., information for associating tag information with each of the plurality of first CPUs 314-1 to 314-*n*) indicating a correspondence relationship between tag information and a first CPU to be selected from the tag information may be stored in the distribution processing unit 312.

For example, when the host device 2 (e.g., the tag generation unit 212) generates tag information according to a certain rule, there may be a configuration in which the distribution processing unit 312 estimates a chip ID from the tag information by using a trained model generated by learning a combination (i.e., a correspondence relationship) between the generated tag information and the chip ID included in a destination address for a certain period, and selects a first CPU by using the chip ID.

In the following description, the first CPU selected in the load distribution process in the above step S6 will be referred to as a target first CPU.

When the process in step S6 is executed, the distribution processing unit 312 stores the first target packet into a first queue corresponding to the target first CPU among the plurality of first queues 313-1 to 313-*n*.

The target first CPU detects that the first target packet is stored in the first queue corresponding to the target first CPU, and executes network processing with respect to the first target packet retrieved from the first queue (step S7).

Here, since the write command stored in the payload included in the first target packet includes a source address and a destination, the target first CPU is required to request the host device 2 to transfer write data based on the source address (i.e., data stored in a location in the memory 22 specified on the basis of the source address).

In this case, the network transmission unit 319 transmits a network packet for requesting the host device 2 to transfer the write data to the host device 2 via the physical layer processing unit 317 (step S8). The network packet transmitted from the memory system 3 (e.g., the network transmission unit 319) to the host device 2 in this step S8 corresponds to a request for reading the write data from the memory 22 provided in the host device 2, and includes the above source address.

When the process in step S8 is executed, the communication processing unit 213 included in the host device 2 generates a network packet (hereinafter referred to as a second target packet) in which the write data read from the memory 22 is stored in the payload on the basis of the source address included in the network packet transmitted from the memory system 3 in the step S8 (step S9).

It is assumed that a header of the second target packet includes the same tag information as the tag information generated in step S2 described above (i.e., the same tag information as that in the first target packet).

When the process in step S9 is executed, the processes in steps S10 to S13 corresponding to the processes in steps S4 to S7 described above are executed. Since the tag information included in the header of the second target packet is the same as the tag information generated in step S2, in a load distribution process executed in step S12, the same first CPU (i.e., the target first CPU) as the first CPU selected in the load distribution process executed in step S6 described above is selected.

When network processing in step S13 is executed, the target first CPU stores the write data included in the payload of the second target packet into a second queue corresponding to the target first CPU among the plurality of second queues 316-1 to 316-n.

Consequently, a second CPU (hereinafter referred to as a target second CPU) corresponding to the second queue in which the write data is stored detects that the write data is stored in the second queue, and executes a process corresponding to the above write command (i.e., a process of writing the write data) (step S14). In this case, the target second CPU accesses a NAND chip corresponding to the target second CPU, and writes the write data retrieved from the second queue into a location of the NAND chip indicated by the above destination address (i.e., a physical address). A predetermined process such as an error correction process or a randomize process may be executed on the write data retrieved from the second queue. In this case, the target second CPU writes data obtained by executing the predetermined process on the write data retrieved from the second queue into the location of the NAND chip indicated by the physical address. That is, the second CPU writes the data on the basis of the write data retrieved from the second queue to the location of the NAND chip indicated by the physical address.

Figure 4:
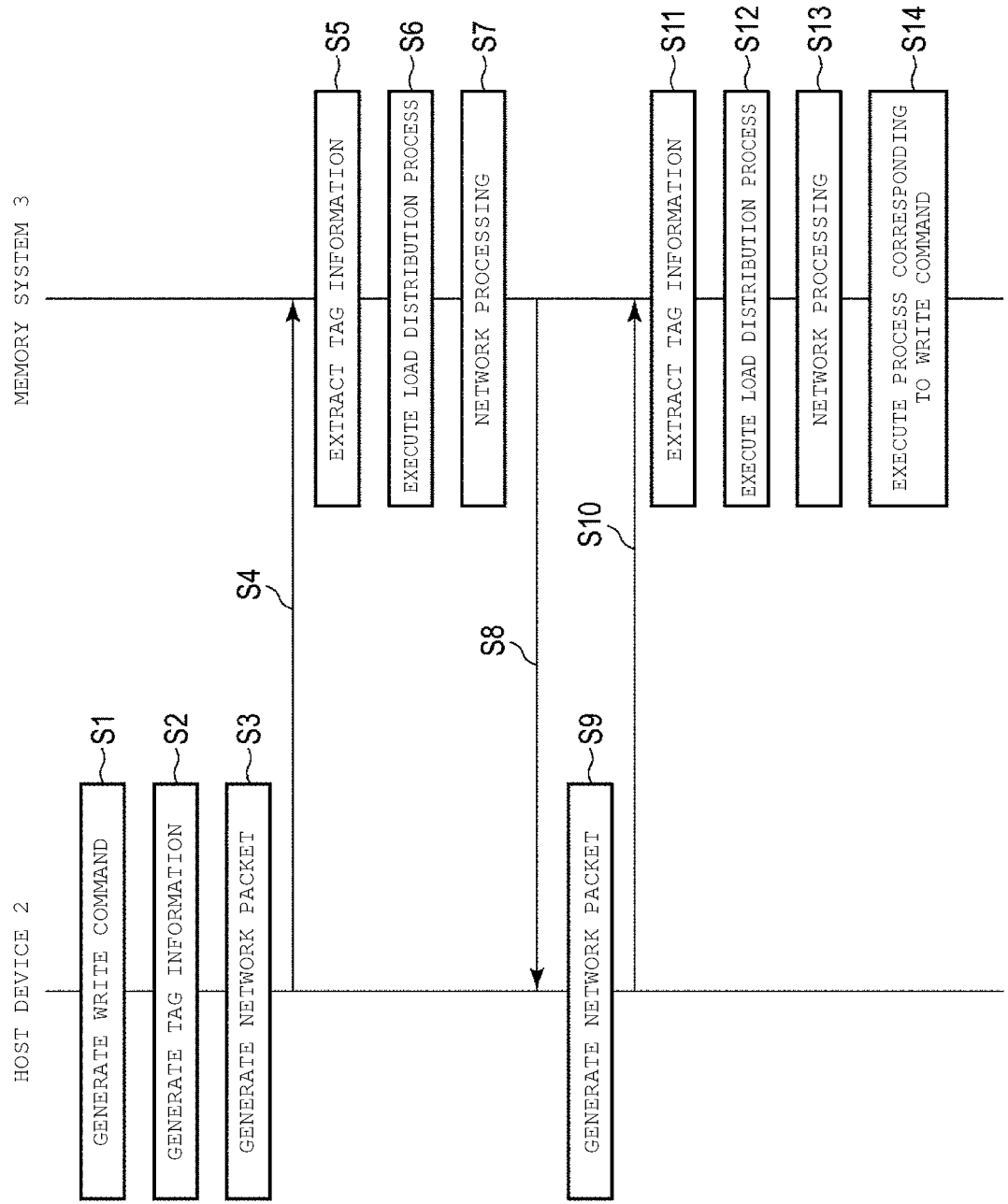
FIG. 4 is a sequence chart showing an example of a processing procedure of a write operation in the embodiment.

Although not shown in FIG. 4, when the process in step S14 is finished, a network packet for notifying that the write data was successfully written in the NAND flash memory 32 is transmitted from the network transmission unit 319 to the host device 2 as a response to the write command, and thus the write operation shown in FIG. 4 is finished.

FIG. 5 shows an outline of a network packet transmitted from the host device 2 to the memory system 3 in the above write operation.

First, when a write command including a destination address 501 is generated in step S1, a network packet 503 having a payload 503a including the write command and the destination address 501 (and a source address) and a header 503b including the tag information 502 generated on the basis of the destination address 501 is transmitted from the host device 2 to the memory system 3.

In step S9, a network packet including write data is generated. When a size of the write data is larger than a size defined in TCP/IP (hereinafter referred to as the maximum size of a network packet), a plurality of network packets having payloads into which write data divided on the basis of the maximum size of the network packet is distributed are generated.

In the example shown in FIG. 5, write data 601 is divided into three pieces of data 601a to 601c. In this case, a network packet 602 includes the data 601a in a payload 602a, a network packet 603 includes the data 601b in a payload 603a, and a network packet 604 includes the data 601c in a payload 604a. These network packets 602, 603, and 604 are transmitted to the memory system 3 from the host device 2.

The headers 602b to 604b each includes the same tag information as the tag information included in the header 503b (i.e., the header that includes the tag information generated on the basis of the destination address 501) of the network packet 503. These headers 602b to 604b are added to the above network packets 602 to 604 (i.e., the payloads 602a to 604a), respectively.

In the above write operation, the network packets 503 and 602 to 604 described with reference to FIG. 5 are transmitted from the host device 2 to the memory system 3, and thus an appropriate first CPU can be selected by using the tag information that is generated on the basis of the destination address included in the write command included in the payload of the network packet 503. The write data included in the payload of each of the network packets 602 to 604 is transferred from the first CPU selected by using the tag information to the second CPU corresponding to the first CPU via the corresponding second queue, and a process of writing the write data (i.e., a process of writing the data 601a to 601c into the NAND chip) is executed by the corresponding second CPU.

Next, an example of the processing procedure of the read operation in the present embodiment will be described with reference to the sequence chart of FIG. 6.

When the host device 2 reads data (hereinafter referred to as read data) stored in the NAND flash memory 32 (e.g., the NAND chip included in the NAND flash memory 32), a read operation request is generated in the host device 2, and the command generation unit 211 in the host device 2 generates a read command in response to the request (step S21).

In the read command generated in step S21, a physical address indicating a location of the NAND chip in the NAND flash memory 32 in which the read data is stored is designated. Specifically, the read command generated in step S21 includes a chip ID assigned to the NAND chip in which the read data is stored and a source address (i.e., a physical address) including a location of the NAND chip (i.e., an address assigned to the location).

Next, the processes in steps S22 to S27 corresponding to the processes in steps S2 to S7 shown in FIG. 4 are executed. In the following description, a network packet generated in step S23 will be referred to as a target packet. A first CPU selected in a load distribution process in step S26 will be referred to as a target first CPU.

Here, a read command is included in a payload of the target packet, and it is necessary to read data from a NAND chip on the basis of the source address (i.e., a physical address) included in the read command.

In this case, the target first CPU stores the read command included in the payload of the target packet into the second queue corresponding to the target first CPU.

Then, a second CPU (hereinafter referred to as a target second CPU) corresponding to the second queue in which the read command is stored detects that the read command is stored in the second queue and executes a process corresponding to the read command retrieved from the second queue (i.e., a process of reading the read data) (step S28). In this case, the target second CPU accesses a NAND chip corresponding to the target second CPU and reads the read data from the location of the NAND chip indicated by the source address (i.e., a physical address) included in the read command retrieved from the second queue.

As described above, the read data read from the NAND chip by the target second CPU is passed from the FTL/NAND processing unit 322 (i.e., the target second CPU) to the network transmission unit 319 via the third queue 320. In this case, the network transmission unit 319 generates a network packet including the read data in the payload as a response to the read command, and transmits the network packet to the host device 2 (step S29). The read data read from the NAND chip may be subjected to a predetermined process such as an error correction process or a randomize cancellation process, and the processed data may be passed from the FTL/NAND processing unit 322 (i.e., the target second CPU) to the network transmission unit 319 via the third queue 320. That is, data based on the data read from the NAND flash memory 32 by the target second CPU may be passed from the FTL/NAND processing unit 322 (i.e., the target second CPU) to the network transmission unit 319 via the third queue 320.

In the above read operation, an appropriate first CPU can be selected by using the tag information generated on the basis of the source address included in the read command, in the same manner as in the write operation. The read command included in the payload of the network packet is transferred from the first CPU selected by using the tag information to the second CPU corresponding to the first CPU via the second queue, and a process corresponding to the read command (i.e., a process of reading the read data from the NAND chip) is executed by the second CPU.

As described above, in the present embodiment, the host device 2 generates a command designating a location of the NAND chip (e.g., a nonvolatile memory chip) in the NAND flash memory 32 (i.e., the first memory), generates tag information on the basis of the location of the NAND chip designated in the generated command, and transmits a network packet having a payload including the generated command and a header including the generated tag information to the memory system 3. In the present embodiment, the memory system 3 includes the controller 31 including a plurality of first CPUs 314-1 to 314-n (e.g., first processing units) configured to execute network processing (e.g., a first process) related to reception of network packets, and a plurality of second CPUs 315-1 to 315-n (e.g., second processing units) corresponding to the plurality of first CPUs 314-1 to 314-n, respectively, and configured to access a plurality of NAND chips 32-1 to 32-n, respectively. The controller 31 extracts tag information included in a header of a network packet transmitted from the host device 2, selects one first CPU from among the plurality of first CPUs 314-1 to 314-n on the basis of the extracted tag information, and causes the selected first CPU to execute network processing. In the present embodiment, a process (e.g., a second process) corresponding to the command included in the payload of the network packet is executed by the second CPU corresponding to the first CPU by which the network processing of the network packet is executed.

In the present embodiment, the plurality of first CPUs 314-1 to 314-n (i.e., CPUs for network processing) and a plurality of second CPUs 315-1 to 315-n (i.e., CPUs for FTL/NAND processing) correspond to each other. The transfer of commands from the plurality of first CPUs 314-1 to 314-n to the plurality of second CPUs 315-1 to 315-n is executed via a plurality of second queues 316-1 to 316-n implemented by SRAMs (e.g., the second memory mounted on the controller 31) having smaller power consumption than that of the DRAM 33.

In the present embodiment, with this configuration, it is not necessary to access a memory space such as the DRAM 33 provided outside the controller 31 when a command is transferred from the first CPU to the second CPU, and thus it is possible to reduce the power consumption of the memory system 3.

In the present embodiment, since a frequency of access to the DRAM 33 can be reduced, it is not necessary to prepare the wideband DRAM interface 318, and an operation frequency of the DRAM interface 318 can be kept low.

In FIG. 2 described above, the comparative example of the present embodiment was described. In the memory system 3' according to the comparative example of the present embodiment, there may be a configuration in which delivery of commands from the first CPU to the second CPU is performed by using queues as in the present embodiment.

According to such a configuration, access to the DRAM 33' can be avoided. However, as described above, in the comparative example of the present embodiment, the first CPU may deliver a command to any second CPU. Thus, it is necessary to provide a star connection type bus for delivering the command, and thus it is not possible to reduce power consumption by applying a simple queue structure as in the present embodiment.

Although the network processing is distributed in the present embodiment, in a case of selecting a first CPU that will execute network processing by using tag information generated on the basis of a location of a NAND chip (i.e., a destination address in a case of writing data into the NAND chip, and a source address in a case of reading data from the NAND chip), the network processing may be concentrated on a specific first CPU. However, in the present embodiment, since the first CPUs 314-1 to 314-n correspond to the plurality of NAND chips 32-1 to 32-n provided in the NAND flash memory 32, is provided, if each of the first CPUs 314-1 to 314-n has a processing capacity for handling a network packet for access to one NAND chip, the network processing is unlikely to become a bottleneck.

In the present embodiment, as tag information used for selecting the first CPU to execute the network processing, for example, tag information including a chip ID assigned to a NAND chip of which a location is designated in a command (i.e., a NAND chip in which write data will be written or read data is written) is generated.

In the present embodiment, with this configuration, the first CPU corresponding to the NAND chip specified by the chip ID included in the tag information can be caused to execute the network processing, and thus a command can be delivered to the second CPU corresponding to the NAND chip from the first CPU without executing complicated processing.

Here, the case where the tag information including the chip ID is generated was described, but for example, the tag information including a physical address indicating a location of the NAND chip may be generated, and the tag information including one or more upper bits of the physical address may be generated.

The tag information in the present embodiment may be any information that can specify NAND chip when a first CPU to execute network processing is selected (i.e., when a load distribution process is executed).

In the present embodiment, the network packet including the tag information in the header is transmitted from the host device 2 to the memory system 3, but the tag information may be included in, for example, an option field defined in IPv4, or may be included in an extension header defined in IPv6. In the present embodiment, since the tag information is located in the field (i.e., a location) that has little influence on the existing network protocol, an existing device can be used for a network device such as the above network switch.

In the present embodiment, it was described that communication based on the TCP/IP regulation is mainly executed between the host device 2 and the memory system 3, but in this case, the tag information may be included in, for example, an option field defined in TCP.

For example, if tag information from which a TCP port number can be determined (acquired) (i.e., tag information that can be converted into a TCP port number) can be generated, the tag information may be included in a field of the TCP port number instead of the TCP port number. In other words, when the network 4 exchanges network packets by using a TCP protocol, the TCP port number used in the TCP protocol may be uniquely determined from the tag information. When, as an interface for connecting the host device 2 and the memory system 3 to each other, the NVMe RDMA Transport Binding standard among the NVMe-oF standards is used, and RoCE v2 is used as an RDMA provider, communication based on the UDP/IP regulations is executed between the host device 2 and the memory system 3. In this case, if tag information from which a UDP port number can be determined (acquired) (i.e., the tag information that can be converted into the UDP port number) can be generated, the tag information may be included in a field of the UDP port number instead of the UDP port number. In other words, when the network 4 exchanges network packets in accordance with a UDP protocol, the UDP port number used in the UDP protocol may be uniquely determined from the tag information.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing system comprising:
    a host device; and
    a memory system connected to the host over a network, the memory system including:
        a memory device including a plurality of memory chips; and
        a controller including:
            a plurality of first processors configured to perform first processing of network packets in at least one of a network layer and a transport layer of a network protocol, each of the first processors being associated with one of the memory chips; and
            a plurality of second processors configured to perform second processing with respect to the memory chips, each of the second processors being associated with one of the memory chips, the controller configured to:
                extract tag information from a header of a network packet received from the host device over the network;
                select one of the first processors associated with a first memory chip, which is one of the memory chips, that is identified based on the tag information; and
                control the selected one of the first processors to perform the first processing with respect to the network packet, which causes one of the second processors associated with the first memory chip to perform the second processing based on a payload of the network packet.

2. The information processing system according to claim 1, wherein the host device is configured to:
    generate a command;
    generate the tag information based on the first memory chip identified by the command; and
    transmit, to the memory system over the network, the network packet that contains the header including the tag information and the payload including the command.

3. The information processing system according to claim 2, further comprising:
    a second memory device, which is a part of the controller, wherein
    the selected one of the first processors stores the command included in the payload in the second memory device, and the one of the second processors retrieves the command from the second memory device to perform the second processing with respect to the first memory chip.

4. The information processing system according to claim 3, wherein the second memory device comprises a static random-access memory (SRAM).

5. The information processing system according to claim 3, wherein
    the memory system further includes a dynamic random-access memory (DRAM), and
    transfer of the command to the one of the second processors is carried out without the command being stored in the DRAM.

6. The information processing system according to claim 3, wherein
    the second memory device includes a plurality of queues corresponding to the plurality of second processors, respectively, and
    the command is stored in one of the queues corresponding to the one of the second processors.

7. The information processing system according to claim 1, wherein the second processing comprises write processing when the command is a write command, and read processing when the command is a read command.

8. The information processing system according to claim 1, wherein the tag information indicates an identifier of the first memory chip.

9. The information processing system according to claim 1, wherein the tag information indicates a physical address in the first memory chip.

10. The information processing system according to claim 1, wherein the tag information includes an upper bit of a physical address in the first memory chip.

11. The information processing system according to claim 1, wherein the tag information is included in an option field of an IPv4 header.

12. The information processing system according to claim 11, wherein
    the network protocol is UDP protocol, and
    the tag information specifies a unique UDP port number.

13. The information processing system according to claim 1, wherein the tag information is included in an extension header of an IPv6 header.

14. The information processing system according to claim 1, wherein the tag information is included in an option field of a TCP header.

15. The information processing system according to claim 1, wherein
the network protocol is TCP protocol, and
the tag information specifies a unique TCP port number.

16. A memory system comprising:
a memory device including a plurality of memory chips; and
a controller including:
a plurality of first processors configured to perform first processing of network packets in at least one of a network layer and a transport layer of a network protocol, each of the first processors being associated with one of the memory chips; and
a plurality of second processors configured to perform second processing with respect to the memory chips, each of the second processors being associated with one of the memory chips, the controller configured to:
extract tag information from a header of a network packet received over a network;
select one of the first processors associated with a first memory chip, which is one of the memory chips, that is identified based on the tag information; and
control the selected one of the first processors to perform the first processing with respect to the network packet, which causes one of the second processors associated with the first memory chip to perform the second processing based on a payload of the network packet.

17. The memory system according to claim 16, wherein the one of the second processors performs processing corresponding to a command included in the payload of the network packet.

18. The memory system according to claim 17, wherein
the controller includes a second memory device therein,
the selected one of the first processors stores the command included in the payload in the second memory, and the one of the second processors retrieves the command from the second memory device to perform the second processing with respect to the first memory chip.

19. The memory system according to claim 18, wherein the second memory device comprises a static random-access memory (SRAM).

20. The memory system according to claim 17, further comprising:
a dynamic random-access memory (DRAM), wherein transfer of the command to the one of the second processors is carried out without the command being stored in the DRAM.

* * * * *